United States Patent
Yokoyama

(10) Patent No.: US 10,082,195 B2
(45) Date of Patent: Sep. 25, 2018

(54) LINEAR TENSIONER

(71) Applicant: Schaeffler Technologies AG & Co. KG, Herzogenaurach (DE)

(72) Inventor: Satoru Yokoyama, Yokohama (JP)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 139 days.

(21) Appl. No.: 15/170,127

(22) Filed: Jun. 1, 2016

(65) Prior Publication Data

US 2017/0045120 A1  Feb. 16, 2017

(30) Foreign Application Priority Data

Aug. 13, 2015 (DE) .................. 10 2015 215 420

(51) Int. Cl.
*F16H 7/22* (2006.01)
*F16H 7/08* (2006.01)

(52) U.S. Cl.
CPC ............. *F16H 7/0829* (2013.01); *F16H 7/08* (2013.01); *F16H 7/0848* (2013.01); *F16H 2007/0806* (2013.01); *F16H 2007/0812* (2013.01); *F16H 2007/0859* (2013.01)

(58) Field of Classification Search
CPC ..... F16H 2007/0806; F16H 2007/0859; F16H 7/0848; F16H 2007/0878; F16H 2007/0812
USPC ......................................................... 474/110
See application file for complete search history.

(56) References Cited

U.S. PATENT DOCUMENTS

| | | | | |
|---|---|---|---|---|
| 4,792,322 A * | 12/1988 | Goppelt | .................... | F16H 7/08 474/136 |
| 5,026,330 A * | 6/1991 | Zermati | ................. | F16H 7/1236 474/110 |
| 5,370,584 A * | 12/1994 | Todd | ........................ | F16H 7/08 474/110 |
| 5,676,614 A * | 10/1997 | Inoue | ........................ | F16H 7/08 474/110 |
| 5,700,214 A * | 12/1997 | Kuznets | .................... | F16H 7/08 474/110 |
| 5,704,860 A * | 1/1998 | Stief | ........................ | F16H 7/08 474/110 |
| 5,782,625 A * | 7/1998 | Young | ........................ | F16H 7/08 474/110 |
| 5,885,179 A * | 3/1999 | Lewis | ........................ | F16H 7/08 474/110 |

(Continued)

FOREIGN PATENT DOCUMENTS

| | | |
|---|---|---|
| DE | 4428556 | 2/1996 |
| DE | 102008033260 | 1/2010 |

*Primary Examiner* — Henry Y Liu
(74) *Attorney, Agent, or Firm* — Volpe and Koenig, P.C.

(57) ABSTRACT

A linear tensioner is provided for tensioning a traction mechanism provided in a drive system with a first adjustment element that has a hollow-cylindrical construction and a second adjustment element that is guided so that it can be moved longitudinally on this first element, wherein contact surfaces are formed on facing end surfaces of the adjustment elements, on which a compression spring actuating at least one of the adjustment elements in the tensioning direction is supported. A transport securing device is provided that prevents, in a specified locked position, a movement of the adjustment elements relative to each other by at least one locking element.

8 Claims, 2 Drawing Sheets

(56) References Cited

U.S. PATENT DOCUMENTS

| | | | | |
|---|---|---|---|---|
| 5,967,923 A * | 10/1999 | Petri | F16F 1/128 | 474/101 |
| 6,093,123 A * | 7/2000 | Baddaria | F01L 1/02 | 474/110 |
| 6,234,929 B1 * | 5/2001 | Rasche | F16H 7/0836 | 474/110 |
| 6,435,992 B2 * | 8/2002 | Wakabayashi | F16H 7/08 | 474/101 |
| 6,849,012 B2 * | 2/2005 | Poiret | F16H 7/0848 | 474/110 |
| 6,935,978 B2 * | 8/2005 | Hayakawa | F16H 7/0836 | 474/109 |
| 7,186,195 B2 * | 3/2007 | Hellmich | F16H 7/0848 | 474/101 |
| 7,189,175 B2 * | 3/2007 | Maino | F16H 7/0848 | 474/110 |
| 7,241,239 B2 * | 7/2007 | Tanaka | F16H 7/0836 | 474/101 |
| 7,322,895 B2 * | 1/2008 | Namuduri | F16H 7/1236 | 474/109 |
| 7,571,632 B2 * | 8/2009 | Yamamoto | F16H 7/0848 | 72/370.21 |
| 7,641,576 B2 * | 1/2010 | Redaelli | F16H 7/08 | 474/109 |
| 7,686,717 B2 * | 3/2010 | Grunau | F16H 7/0848 | 474/109 |
| 8,100,792 B2 * | 1/2012 | Kawahara | F16H 7/1236 | 474/109 |
| 8,403,781 B2 * | 3/2013 | Perissinotto | F16H 7/0836 | 474/101 |
| 8,727,922 B2 * | 5/2014 | Perissinotto | F16H 7/0836 | 474/110 |
| 8,888,624 B2 * | 11/2014 | Bauer | F16H 7/08 | 474/110 |
| 9,423,009 B2 * | 8/2016 | Satomura | F16H 7/1236 | |
| 2003/0008738 A1 * | 1/2003 | Rossato | F16H 7/0848 | 474/110 |
| 2009/0215563 A1 * | 8/2009 | Sauermann | F16H 7/1281 | 474/135 |
| 2009/0286637 A1 * | 11/2009 | Stief | F16H 7/1281 | 474/135 |
| 2011/0207567 A1 * | 8/2011 | Kaiser | F16H 7/0836 | 474/110 |

* cited by examiner

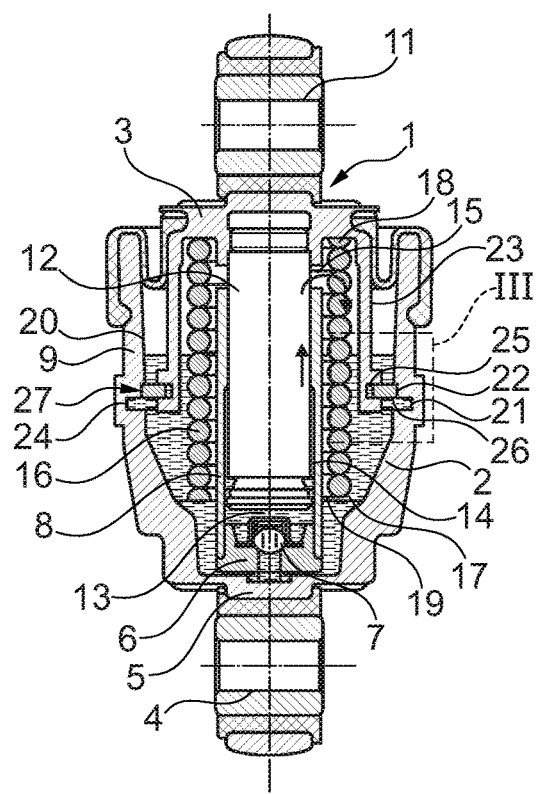
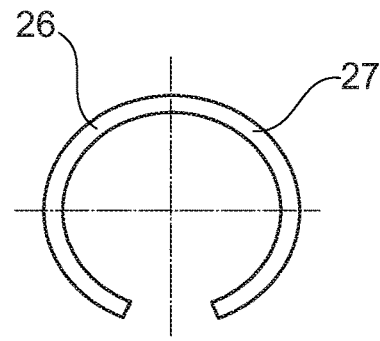
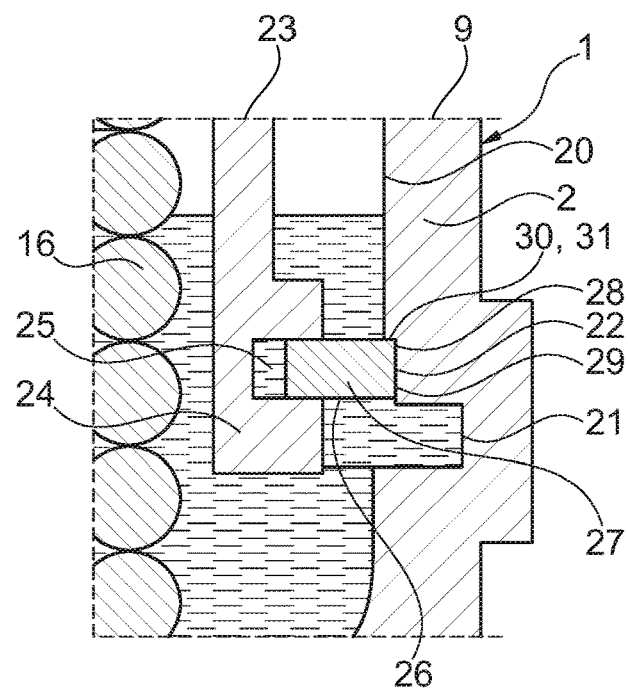

LINEAR TENSIONER

INCORPORATION BY REFERENCE

The following documents are incorporated herein by reference as if fully set forth: German Patent Application No. 102015215420.3, filed Aug. 13, 2015.

FIELD OF THE INVENTION

The invention relates to a linear tensioner for tensioning a traction mechanism provided in a chive system with a first adjustment element that has a hollow-cylindrical construction at least in some sections, on which a second adjustment element is guided so that it can be moved, wherein contact surfaces are constructed on facing end surfaces of the adjustment elements, on which a compression spring actuating at least one of the adjustment elements in the tensioning direction is supported, and wherein a transport securing device is provided that prevents a movement of the adjustment elements relative to each other in the tensioning direction by a lock in a predetermined position.

PRIOR ART

Such linear tensioners are used, in particular, in reciprocating-piston internal combustion engines for tensioning a traction mechanism constructed as a chive belt or chain. For the use of a drive belt as the traction mechanism, the drive system can be a drive system that is provided as a power unit chive that can be used to chive a generator, an air-conditioning compressor, servo pumps, etc. Typically, the one adjustment element is guided so that it can pivot on the crankcase, while the other adjustment element engages on a tensioning lever that holds a tensioning roller and is also linked so that it can pivot on the crankcase. By setting a sufficient belt tension it is guaranteed that the drive belt neither slips on the belt disk nor is caused to have severe oscillations.

Such a linear tensioner is also used for tensioning a timing chain of a timing assembly of a reciprocating-piston internal combustion engine, by which the camshaft is driven from the crankshaft. In this case, the corresponding linear tensioner is arranged within the crankcase or a wheel cover and interacts with a tensioning rail contacting the chain.

Linear tensioners that are provided, for example, for use in a reciprocating-piston internal combustion engine, are delivered as an assembled part for final installation and must be transported before installation into the drive system in a state in which the two adjustment elements are pushed against the force of the compression spring into a final position. Only in this state of the linear tensioner can the traction mechanism be placed on the drive wheel and the driven wheels of the drive system.

A linear tensioner of the present class is known from DE 44 28 556 A1. Here, the linear tensioner has a cylinder acting as the first adjustment element and a second adjustment element constructed as a tappet. A compression spring is supported, first, by a spring plate on the tappet and, second, by a disk on a contact surface of the cylinder. For reaching a transport position of the linear tensioner, the tappet can be pushed together with a hydraulic piston of a hydraulic adjustment and damping unit into the cylinder far enough that the compression spring is maximally pretensioned. Between the cylinder and the tappet there is a locking arrangement that fix the two components in this position relative to each other, whereby a transport securing device is created. Here, the locking arrangement is formed by a circumferential groove formed on the tappet and a two-armed spring link that is introduced into the cylinder via a slot and engages in the circumferential groove with parallel first sections of the legs, and emerges with the ends of the legs out from an opposing slot of the cylinder. Furthermore, second sections of the legs run toward each other with a radius, whereby on the spring link pushed into a certain position between the legs, a cross section is formed that corresponds essentially to the outer diameter of the tappet. This has the result that, in the first position of the spring link, the parallel sections of the legs engage in the circumferential groove of the tappet and these lock until successful installation of the linear tensioner, while, in another position of the spring link, the sections of the two legs running with a radius release the tappet, so that this can move freely and thus can transfer the tensioning force to the traction mechanism.

Furthermore, from DE 10 2008 033 260 A1 a linear tensioner constructed as a chain tensioner is known. Here, in a blind hole of a tensioner housing, a first pot-shaped adjustment element is arranged that holds, in its interior, a second similarly pot-shaped adjustment element used as a piston. For creating a transport securing device, a groove is provided on an outer lateral surface of the second adjustment element, while the first adjustment element has a cross-hole. A transport securing device pin is pushed into this cross-hole when it aligns with the groove, wherein this cross-hole incidentally acts as an oil outlet opening for the chain tensioner function.

SUMMARY

The object of the invention is to create a linear tensioner of the type specified above, in which, due to the use of a transport securing device, the structural dimensions of the linear tensioners are not increased. In addition, the locking arrangement should be easy to handle in large batch production.

This object is achieved by a linear tensioner with one or more of the features of the invention. Advantageous constructions are given below and in the claims, which disclose aspect of the invention that are useable by themselves or in different combinations with each other.

Then the adjustment elements should be moved out from the locked position against the force of the compression spring into an unlocked position, in which the locking element is automatically moved into a receptacle of the one adjustment element, whereby the adjustment elements are permanently unlocked relative to each other. Thus, the one adjustment element is pushed relative to the other against the spring force by a short path that is sufficient to move the corresponding locking element out of its engaged position and into a receptacle. This has the consequence that the two adjustment elements can then be shifted relative to each other unimpaired. This should then be the case, for example, if a drive belt has been placed on the corresponding tensioning roller or a chain on the corresponding tensioning rail.

The linear tensioner delivered for final installation thus can be unlocked after its integration into the drive system and the placement of the traction mechanism by a simple process, namely a short force loading on at least one of the adjustment elements. This force loading can be realized with the help of a corresponding device. In comparison to known transport securing devices in which a locking element must be removed or pushed manually with a relatively large force, a risk of injury is completely eliminated. There is also the possibility here to integrate the locking element in the linear tensioner such that its structural dimensions are not increased. Even in the area of the power unit drive of a reciprocating-piston internal combustion engine there is usually only constricted installation spaces for tensioning systems, so that a transport securing device that is integrated in the linear tensioner is very important.

In contrast, the linear tensioner according to DE 44 28 556 A1 is provided with locking elements that are constructed as a spring link that engages in slots of the cylinder and in a circumferential groove of the tappet. The spring link projects both in the locked position and also in the unlocked position radially past the cylinder and therefore increases the dimensions of the linear tensioner. For belt or chain drives in reciprocating-piston internal combustion engines, as already described, only a very limited installation space is available for housing the linear tensioner. The spring link then can be moved only in the unlocked position of the transport securing device, if initially an exactly metered axial force is exerted on the tappet, whereupon then the spring link must be pulled manually into its longitudinal direction into a position in which the legs release the tappet. There is also the problem that the spring link remains permanently on the linear tensioner during the subsequent operation of the reciprocating-piston internal combustion engine and can cause damage to the sealing surface of the tappet.

In another construction of the invention, the at least one locking element should be carried along by the second adjustment element and have a radially elastic construction relative to this element, wherein, in the locked position, it engages behind a locking surface of the first adjustment element and wherein, in the unlocked position, it snaps into the receptacle of the first adjustment element and is simultaneously decoupled from the second adjustment element. If the linear tensioner fixed in the pushed-together state by the transport securing device according to the invention is mounted on the reciprocating-piston internal combustion engine and if the traction mechanism is arranged on the drive wheel, the driven wheels, and the tensioning element actuated by the linear tensioner, this causes a short actuation of the two adjustment elements relative to each other against the force of the compression spring. Therefore, the locking element carried along in the longitudinal direction is detached and can move out from its previously assumed position in the second adjustment element into the receptacle of the first adjustment element. Therefore, the two adjustment elements are then guided so that they can move relative to each other in the longitudinal direction, so that the tensioning force of the linear tensioner is transferred onto the traction mechanism.

Because the at least one locking element has a radially elastic construction or is loaded by a spring, it remains during the subsequent operation of the drive system within the receptacle and does not negatively affect the function of the linear tensioner. In the kinematic reversal of the described arrangement of the locking element within the adjustment elements, this can naturally also be carried along by the first hollow-cylindrical adjustment element and have an elastic construction radially inward in the direction of the second adjustment element. There is also the possibility of constructing the locking element itself as a spring or loading the locking element in the radial direction by a separate spring.

Furthermore, the at least one locking element should be constructed as a radially elastic, pretensioned piston ring that is guided in an outer ring groove of the second adjustment element and is supported in the locked position on the locking surface that is formed by an axially directed ring surface created by a stepped section of an inner lateral surface of the first adjustment element. The piston ring should snap, in the unlocked position, into an inner circumferential groove directly adjacent to the locking surface such that the piston ring is located completely outside of the outer ring groove. Thus, the locking element can be constructed advantageously as a standard part, namely as a piston ring. Such piston rings are used, for example, on working piston of reciprocating-piston internal combustion engines as compression rings and have a slot designated as a ring joint on the circumference.

Such a piston ring that is used, incidentally, also on hydraulic actuation elements of automatic transmissions, is usually pretensioned radially outward by a corresponding bending tension into its installed state. In the locked position, this piston ring contacts a circumferential surface formed by the stepped section and the spring force of the compression spring is supported on the axially active ring surface. On the other side, the piston ring is guided internally in the outer ring groove of the second adjustment element, whereby the spring force is transferred onto the piston ring. If the two adjustment elements are now pushed against the force of the compression spring relative to each other so far until the piston ring contacts with its end surface against a side wall of the circumferential groove of the second adjustment element, then the piston ring displaced in the axial direction snaps into the inner circumferential groove and here simultaneously completely leaves the outer ring groove of the second adjustment element. The remaining radial pretensioning of the piston ring ensures that this remains within the circumferential groove with a corresponding pretension.

If, as explained above, the locking surface and the receptacle are constructed on an inner lateral surface of the first adjustment element, the outer ring groove can be constructed on a hollow cylinder radially surrounding the compression spring. Here it is further provided that the outer ring groove is constructed on an end of the hollow cylinder facing away from the contact surface of the second adjustment element, wherein the hollow cylinder has, in this area, a greater wall thickness. The axial length of this hollow cylinder and the position of the locking surface in the first adjustment element are tuned to each other such that the locking effect of the transport securing device is in effect when the two adjustment elements are moved against the force of the compression spring nearly into their final positions. Only a residual spring displacement is required that is needed for unlocking this device. Advantageously, the stepped section of the inner lateral surface and the receptacle are approximately in the center viewed in the axial direction of the hollow-cylindrical adjustment element.

Advantageously, the linear tensioner can have a hydraulic adjustment and damping unit, wherein, on the first adjustment element, a pot-shaped housing and a hydraulic cylinder provided on its base with a non-return valve are constructed and wherein the second adjustment element has a piston guided in the hydraulic cylinder with the formation of a leakage gap and a hollow cylinder radially surrounding the compression spring. The hydraulic cylinder and the piston guided in this cylinder here enclose a compression chamber, into which pressurized medium is suctioned for a corresponding outward movement of the piston.

The compression spring surrounds the hydraulic cylinder and is enclosed according to the invention partially by the hollow cylinder that extends advantageously out from a base of the second adjustment element. Here, the at least one locking element should be arranged within an oil reservoir formed between the housing and the cylinder. In this case, the hollow cylinder extends into the oil reservoir, which surrounds the hollow-cylindrical section of the first adjustment element. As already described, the locking element can be constructed as a piston ring and supported in a radially elastic way on a locking surface acting in the axial direction. This piston ring is guided here in an outer ring groove of the second adjustment element and is pushed by an axial force loading into a released position in which it snaps into a receptacle of the first adjustment element.

The oil reservoir is closed on the open end of the housing by a bellows seal that is fixed on one side in a receptacle groove of the pot-shaped section and on the other side in a receptacle groove of the second adjustment element. The linear tensioner can be supported in its construction as a belt tensioner by a fixing eyelet provided on the first adjustment element so that it is fixed in place, wherein another fixing eyelet contacts a tensioning lever holding a tensioning roller or a tensioning roller directly. In addition, however, there is also the possibility of arranging the linear tensioner within a pendulum tensioner provided, in particular, in starter-generator drives, wherein then the fixing eyelet mentioned above is not used for fixed-in-place support. The linear tensioner constructed according to the invention, however, can also be used for tensioning a chain chive, wherein the outer housing is arranged within a crankcase of the reciprocating-piston internal combustion engine.

The invention is not limited to the specified combination of features of the independent claims with the dependent claims. There are also other possibilities to combine individual features with each other, especially those that are given from the claims, the following description of the embodiment, or directly from the figures.

BRIEF DESCRIPTION OF THE DRAWINGS

For further explanation of the invention, reference will be made to the figures in which an embodiment of the invention is shown simplified. Shown are:

FIG. 1 a longitudinal section through a linear tensioner according to the invention, in which a locking element constructed as a piston ring is located in its locked position, FIG. 2 the piston ring used in FIG. 1 in a plan view, FIG. 3 an enlarged representation of a section III from FIG. 1 in the area of an engagement of the piston ring guided in a ring groove in a stepped section of an inner lateral surface of a first adjustment element, FIG. 4 the linear tensioner shown in FIG. 1 after an unlocking of the piston ring, and FIG. 5 an enlarged representation of a section V from FIG. 4 in the area of an engagement of the piston ring in a circumferential groove on the inner lateral surface of the first adjustment element.

DETAILED DESCRIPTION OF THE PREFERRED EMBODIMENTS

Figure 4:
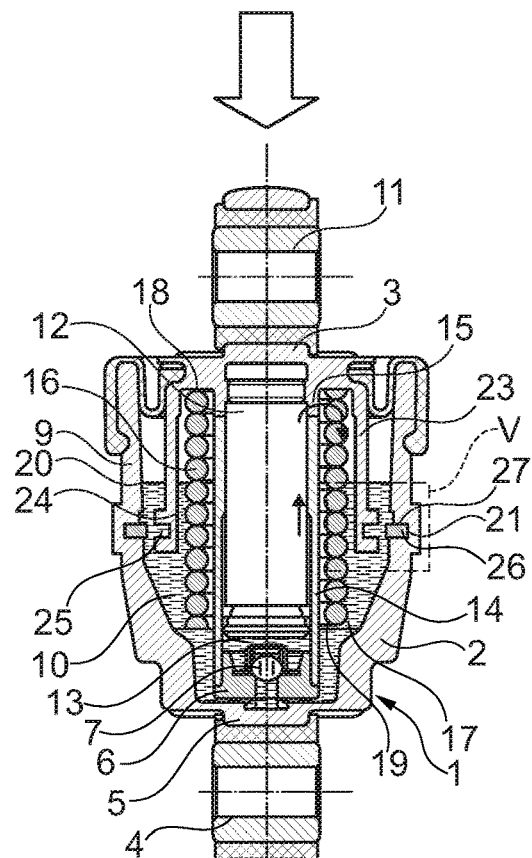

In FIG. 1, 1 designates a linear tensioner that has a first adjustment element 2 and a second adjustment element 3. The first adjustment element 2 has a fixing eyelet 4 by which the linear tensioner 1 can be mounted so that it is fixed in place and can pivot on a crankcase of a reciprocating-piston internal combustion engine. A base 5 of the first adjustment element 2 on which a valve housing 6 of a non-return valve 7 is fixed connects to the fixing eyelet 4.

A hydraulic cylinder 8 extends out from this valve housing 6 in the longitudinal direction of the linear tensioner 1, wherein this cylinder is connected to the valve housing 6 in a sealed manner. Extending from the base 5 is a hollow-cylindrical section 9 of the first adjustment element 2 that is constructed in multiple different steps and with inclined wall sections. This hollow-cylindrical section 9 surrounds the hydraulic cylinder 8 with a radial distance, which forms an oil reservoir 10.

The second adjustment element 3 is arranged co-axial to the first adjustment element 2 and also has a fixing eyelet 11. Connected to the second adjustment element 3 is a piston 12 that is concentric to this element and is guided so that it can be moved in the hydraulic cylinder 8 allocated to the first adjustment element 2. Here, the piston 12 encloses a compression chamber 13 together with the hydraulic cylinder 8 and the valve housing 6 arranged on one end. Here, the hydraulic cylinder 8 holds the piston 12 with the formation of a leakage gap 14. Pressurized medium discharged via this leakage gap 14 from the compression chamber 13 can be discharged via at least one radial opening 15 into the oil reservoir 10.

As further emerges from FIG. 1, the hydraulic cylinder 8 is enclosed on its circumference by a compression spring 16, wherein this compression spring 16 is supported in the axial direction on a first contact surface 17 allocated to the first adjustment element 2 and on a second contact surface 18 formed directly on the second adjustment element 3. Here, a spring plate 19 is mounted for forming the first contact surface 17.

In FIG. 1, the linear tensioner 1 assumes a position in which the piston 12 is retracted into the hydraulic cylinder 8 against the tensioning force of the compression spring 16 and is pretensioned by this spring in the range of its maximum pretension. An inner lateral surface 20 of the hollow-cylindrical section 9 has, as can be also seen from the representation, an inner circumferential groove 21 that connects directly to a flat groove 22 with the formation of a step.

Extending from the second adjustment element 3 is a hollow cylinder 23 that surrounds the compression spring 16 by an axial partial area. This hollow cylinder 23 has, on its free end, a section 24 that is constructed with a greater wall thickness in comparison with the remaining part of the hollow cylinder 23. An outer ring groove 25 that holds locking element 26 in the form of a piston ring 27 slotted on the circumference is provided in this section 24 of the hollow cylinder 23 radially on the outside.

As can be seen, in particular, from FIG. 3, this piston ring 27 is elastic radially to the outside and contacts with its outer lateral surface 28 an inner lateral surface 29 of the flat groove 22. Here, the spring force of the compression spring 16 is supported by the piston ring 27 guided in the outer ring groove 25 on a locking surface 30 that is constructed as ring surface 31.

In FIGS. 1 and 3, the linear tensioner 1 is in a state in which this is delivered for assembly within a belt chive of a reciprocating-piston internal combustion engine. During this transport and subsequent assembly, the second adjustment element 3 should be retracted into the first adjustment element 2. This transport securing device is realized by the piston ring 27 that is shown incidentally in a plan view in FIG. 2. This should engage, in the locked position of the transport securing device, both in the outer ring groove 25 and also in the flat groove 22 and is thus supported in the axial direction on the locking surface 30.

Figure 5:
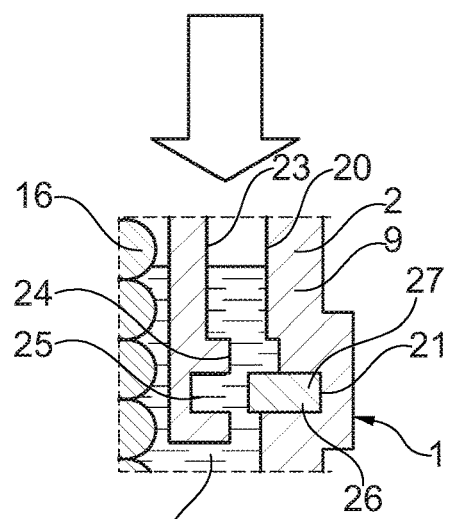

As can be further gathered from FIGS. 4 and 5, for unlocking the locking element 26, a force shown by an arrow is exerted on the second adjustment element 3, whereby the piston ring 27 guided in the outer ring groove 25 is displaced so far in the axial direction that it snaps into the inner circumferential groove 21 formed with greater depth. This has the result that the piston ring 27 emerges radially out of the outer ring groove 25 and thus releases the 23. The linear tensioner 1 is then consequently located in its unlocked state, in which the second adjustment element 3 can be displaced in the longitudinal direction relative to the first adjustment element 2.

LIST OF REFERENCE SYMBOLS

1 Linear tensioner
2 First adjustment element
3 Second adjustment element
4 Fixing eyelet of 2
5 Base of 2
6 Valve housing
7 Non-return valve
8 Hydraulic cylinder
9 Hollow-cylindrical section of 2
10 Oil reservoir
11 Fixing eyelet von 3
12 Piston
13 Compression chamber
14 Leakage gap
15 Radial opening
16 Compression spring
17 First contact surface
18 Second contact surface
19 Spring plate
20 Inner lateral surface of 2
21 Inner circumferential groove
22 Flat groove
23 Hollow cylinder
24 Section of 23
25 Outer ring groove
26 Locking element
27 Piston ring
28 Outer lateral surface von 27
29 Inner lateral surface von 22
30 Locking surface
31 Ring surface

The invention claimed is:

1. A linear tensioner for tensioning a traction mechanism provided in a drive system, the linear tensioner comprising:
a first adjustment element that has a hollow-cylindrical construction at least in some sections and on which a second adjustment element is guided for longitudinal movement,
contact surfaces are constructed on facing end surfaces of the adjustment elements and on which a compression spring actuating at least one of the adjustment elements in a tensioning direction is supported, and
a transport securing device is provided that prevents a movement of the adjustment elements relative to each other in the tensioning direction by at least one locking element in a specified locked position,
the adjustment elements are moved relative to each other out of the locked position against a force of the compression spring into an unlocked position, in which the at least one locking element is automatically displaced into a receptacle of the first adjustment element to permanently unlock the adjustment elements relative to each other,
the first adjustment element including an inner groove that accommodates the at least one locking element in the locked position,
the inner groove is directly axially adjacent to the receptacle, and
the at least one locking element comprises a radially elastic, pretensioned piston ring guided in an outer ring groove of the second adjustment element, the outer ring groove formed between a first radial projection and a second radial projection positioned at a terminal end of the second adjustment element, the first and second radial projections having a greater outer diameter than an outer diameter of a remainder of the second adjustment element.

2. The linear tensioner according to claim 1, wherein the at least one locking element is carried along by the second adjustment element and has a radially elastic construction relative to the second adjustment element, and, in the locked position, the at least one locking element engages behind a locking surface defined by the inner groove of the first adjustment element and, in the unlocked position, the at least one locking element snaps into the receptacle of the first adjustment element and is simultaneously decoupled from the second adjustment element.

3. The linear tensioner according to claim 2, wherein the piston ring is supported in the locked position on the locking surface that is formed by the inner groove and created by a stepped section of an inner lateral surface of the first adjustment element, and, in the unlocked position, snaps into the receptacle adjacent to the locking surface in the axial direction, such that the piston ring is located completely outside of the outer ring groove.

4. The linear tensioner according to claim 3, wherein the outer ring groove is constructed on a hollow cylinder radially surrounding the compression spring.

5. The linear tensioner according to claim 4, wherein the outer ring groove is constructed on an end of the hollow cylinder facing away from the contact surface of the second adjustment element, and the hollow cylinder has a greater wall thickness in an area of the end of the hollow cylinder.

6. The linear tensioner according to claim 1, wherein the linear tensioner has a hydraulic adjustment and damping unit, and the first adjustment element includes a pot-shaped housing and a hydraulic cylinder provided on a base thereof with a non-return valve arranged thereon, and the second adjustment element has a piston guided in the hydraulic cylinder with formation of a leakage gap and a hollow cylinder partially radially surrounding the compression spring.

7. The linear tensioner according to claim 6, wherein the at least one locking element is arranged within an oil reservoir formed between the housing and the hydraulic cylinder.

8. The linear tensioner according to claim 1, wherein the linear tensioner has a hydraulic adjustment and damping unit, and on the first adjustment element there is a housing and a hydraulic cylinder provided on a base thereof with a non-return valve and the second adjustment element has a piston guided in the hydraulic cylinder with the formation of a leakage gap and a hollow cylinder partially radially surrounding the compression spring, and the piston ring is supported, in the locked position, in the axial direction on a locking surface that is formed by the inner groove and created by a stepped section of an inner lateral surface of the first adjustment element, and the piston ring, in the unlocked position, snaps into the receptacle adjacent to the locking surface in the axial direction, such that the piston ring is located completely outside of the outer ring groove.

* * * * *